United States Patent
Poornachandran et al.

(10) Patent No.: US 12,217,175 B2
(45) Date of Patent: Feb. 4, 2025

(54) METHODS AND APPARATUS TO CONDITIONALLY ACTIVATE A BIG CORE IN A COMPUTING SYSTEM

(71) Applicant: Intel Corporation, Santa Clara, CA (US)

(72) Inventors: Rajesh Poornachandran, Portland, OR (US); Vincent Zimmer, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 17/560,025

(22) Filed: Dec. 22, 2021

(65) Prior Publication Data
US 2022/0113978 A1 Apr. 14, 2022

Related U.S. Application Data

(60) Provisional application No. 63/222,938, filed on Jul. 16, 2021.

(51) Int. Cl.
*G06F 9/46* (2006.01)
*G06F 9/38* (2018.01)
(Continued)

(52) U.S. Cl.
CPC ............ *G06N 3/08* (2013.01); *G06F 9/3877* (2013.01); *G06F 9/455* (2013.01);
(Continued)

(58) Field of Classification Search
CPC .... G06F 9/455; G06F 9/45508; G06F 9/5066; G06F 21/54; G06F 2209/501; G06F 2209/5017; G06F 2209/503
See application file for complete search history.

(56) References Cited

U.S. PATENT DOCUMENTS 8,108,844 B2   1/2012   Crutchfield et al.
8,683,468 B2   3/2014   Breternitz et al.
(Continued)

FOREIGN PATENT DOCUMENTS

CN   103930868 A   7/2014
CN   111967590 A   11/2020

OTHER PUBLICATIONS

Zoph et al., "Neural architecture search with reinforcement learning," ICLR conference, 2017, 16 pages.
Cai et al., "ProxylessNAS: Direct neural architecture search on target task and hardware," ICLR conference, 2019, 13 pages.
Elsken et al., "Neural Architecture Search: A Survey," Journal of Machine Learning Research, vol. 20, Issue 1, published Mar. 2019, 21 pages.
(Continued)

*Primary Examiner* — Gregory A Kessler
(74) *Attorney, Agent, or Firm* — HANLEY, FLIGHT & ZIMMERMAN, LLC

(57) ABSTRACT

Methods, apparatus, and articles of manufacture to conditionally activate a big core in a computing system are disclosed. An example apparatus including instructions stored in the apparatus; and processor circuitry to execute the instructions to: in response to a request to operate two or more processing devices as a single processing device, determine whether the two or more processing devices are available and capable of executing instructions according to the request; when the two or more processing devices are available and capable: split the instructions into first sub-instructions and second sub-instructions; provide (a) the first sub-instructions to a first processing device of the two or more processing devices and (b) the second sub-instructions to a second processing device of the two or more processing devices; and generate an output by combining a first output of the first processing device and a second output of the second processing device.

25 Claims, 10 Drawing Sheets

(51) Int. Cl.
  *G06F 9/455* (2018.01)
  *G06F 9/48* (2006.01)
  *G06F 9/50* (2006.01)
  *G06F 21/54* (2013.01)
  *G06N 3/042* (2023.01)
  *G06N 3/063* (2023.01)
  *G06N 3/08* (2023.01)

(52) U.S. Cl.
  CPC ........ *G06F 9/45508* (2013.01); *G06F 9/4856* (2013.01); *G06F 9/5044* (2013.01); *G06F 9/505* (2013.01); *G06F 9/5066* (2013.01); *G06F 21/54* (2013.01); *G06N 3/042* (2023.01); *G06N 3/063* (2013.01); *G06F 2209/501* (2013.01); *G06F 2209/5017* (2013.01); *G06F 2209/503* (2013.01)

(56) References Cited

U.S. PATENT DOCUMENTS

| | | | |
|---|---|---|---|
| 8,745,603 | B2 | 6/2014 | McGuire et al. |
| 9,122,842 | B2 | 9/2015 | Shin et al. |
| 10,649,749 | B1 | 5/2020 | Brooker et al. |
| 10,930,060 | B2 | 2/2021 | Surti et al. |
| 2013/0031545 | A1 | 1/2013 | Choudhury et al. |
| 2013/0031550 | A1 | 1/2013 | Choudhury et al. |
| 2013/0139137 | A1 | 5/2013 | Zhao |
| 2015/0150019 | A1 | 5/2015 | Sheaffer et al. |
| 2018/0267830 | A1 | 9/2018 | Rivera |
| 2019/0014176 | A1 | 1/2019 | Tormasov |
| 2019/0253257 | A1 | 8/2019 | Yan |
| 2020/0007464 | A1 | 1/2020 | Lo et al. |
| 2020/0027193 | A1 | 1/2020 | Wilt et al. |
| 2020/0184319 | A1 | 6/2020 | Croxford |
| 2020/0233690 | A1 | 7/2020 | Bhatnagar et al. |
| 2020/0314171 | A1 | 10/2020 | Featonby et al. |
| 2021/0004276 | A1 | 1/2021 | Balasubramanian et al. |
| 2021/0055959 | A1 | 2/2021 | Rehman |
| 2021/0110043 | A1 | 4/2021 | Berger et al. |
| 2021/0117249 | A1 | 4/2021 | Doshi et al. |
| 2021/0181951 | A1 | 6/2021 | Jin |
| 2021/0200553 | A1 | 7/2021 | Memon et al. |
| 2021/0255788 | A1 | 8/2021 | Mudit |
| 2021/0392142 | A1 | 12/2021 | Stephens |
| 2022/0114451 | A1 | 4/2022 | Lacewell et al. |
| 2022/0116284 | A1 | 4/2022 | Iyer et al. |
| 2022/0229707 | A1 | 7/2022 | Lange |
| 2022/0413943 | A1 | 12/2022 | Poornachandran et al. |
| 2024/0232622 | A9 | 7/2024 | Poornachandran et al. |

OTHER PUBLICATIONS

Jin et al., "Auto-Keras: An Efficient Neural Architecture Search System," Department of Computer Science and Engineering, Texas A&M University, Mar. 26, 2019, 11 pages.

Hu et al., "DSNAS: Direct Neural Architecture Search without Parameter Retraining," Computer Vision Foundation, 2020, 10 pages.

Cai et al., "Once for All: Train One Network and Specialize it for Efficient Deployment", 2020 International Conference on Learning Representations, Apr. 2020, 15 pages.

International Searching Authority, "International Search Report," issued in connection with International Patent Application No. PCT/CN2021/141150, dated Mar. 23, 2022, 4 pages.

International Searching Authority, "Written Opinion," issued in connection with International Patent Application No. PCT/CN2021/141150, mailed on Mar. 23, 2022, 5 pages.

Taiwan Intellectual Property Office, "Notice of Supplement and Correction of Application," issued in connection with Taiwanese Patent Application No. 109120637, dated Mar. 29, 2022, 4 Pages, [English Machine Translation Included].

Netherlands Intellectual Property Office, "Decision formal defects," issued in connection with Netherlands Patent Application No. 2031965, dated Jun. 1, 2022, 4 Pages, [English Machine Translation Included].

International Searching Authority, "International Search Report," issued in connection with International Patent Application No. PCT/US2022/034805, mailed on Oct. 17, 2022, 3 pages.

International Searching Authority, "Written Opinion," issued in connection with International Patent Application No. PCT/US2022/034805, mailed on Oct. 17, 2022, 4 pages.

Netherlands Intellectual Property Office, "Search Report National," issued in connection with Netherlands Patent Application No. 2031965, dated Feb. 8, 2023, 20 pages. [English language machine translation included.].

International Searching Authority, "International Preliminary Report on Patentability," issued in connection with International Patent Application No. PCT/CN2021/141150, issued on Jan. 4, 2024, 7 pages.

International Searching Authority, "International Preliminary Report on Patentability," issued in connection with International Patent Application No. PCT/US2022/034805, issued on Jan. 25, 2024, 6 pages.

"XuCode: An Innovative Technology for Implementing Complex Instruction Flow," Intel, published May 6, 2021, 5 pages.

United States Patent and Trademark Office, "Non-Final Office Action," issued in connection with U.S. Appl. No. 17/705,256, dated Sep. 3, 2024, 28 pages.

METHODS AND APPARATUS TO CONDITIONALLY ACTIVATE A BIG CORE IN A COMPUTING SYSTEM

RELATED APPLICATION

This patent claims the benefit of U.S. Provisional Patent Application No. 63/222,938, which was filed on Jul. 16, 2021. U.S. Provisional Patent Application No. 63/222,938 is hereby incorporated herein by reference in its entirety. Priority to U.S. Provisional Patent Application No. 63/222, 938 is hereby claimed.

FIELD OF THE DISCLOSURE

This disclosure relates generally to computing systems and, more particularly, to methods and apparatus to conditionally activate a big core in a computing system.

BACKGROUND

Some computing systems include one or more big device processors (e.g., cores) and/or one or more small device processors (e.g., atoms) to perform operations. A big device processor may include one or more cores and/or processing units while a small device processor may have one or two cores. Additionally, the big device processor is more powerful and/or consumes more space than a small device processor. A big device processor can handle high performance applications while a small device processor offers lower power, a smaller footprint, and more modest performance compared to big device processors. Examples of small device processors include Intel® Atom®, Intel® Quark® SoC, LITTLE cores, etc.

DETAILED DESCRIPTION

Figure 1:
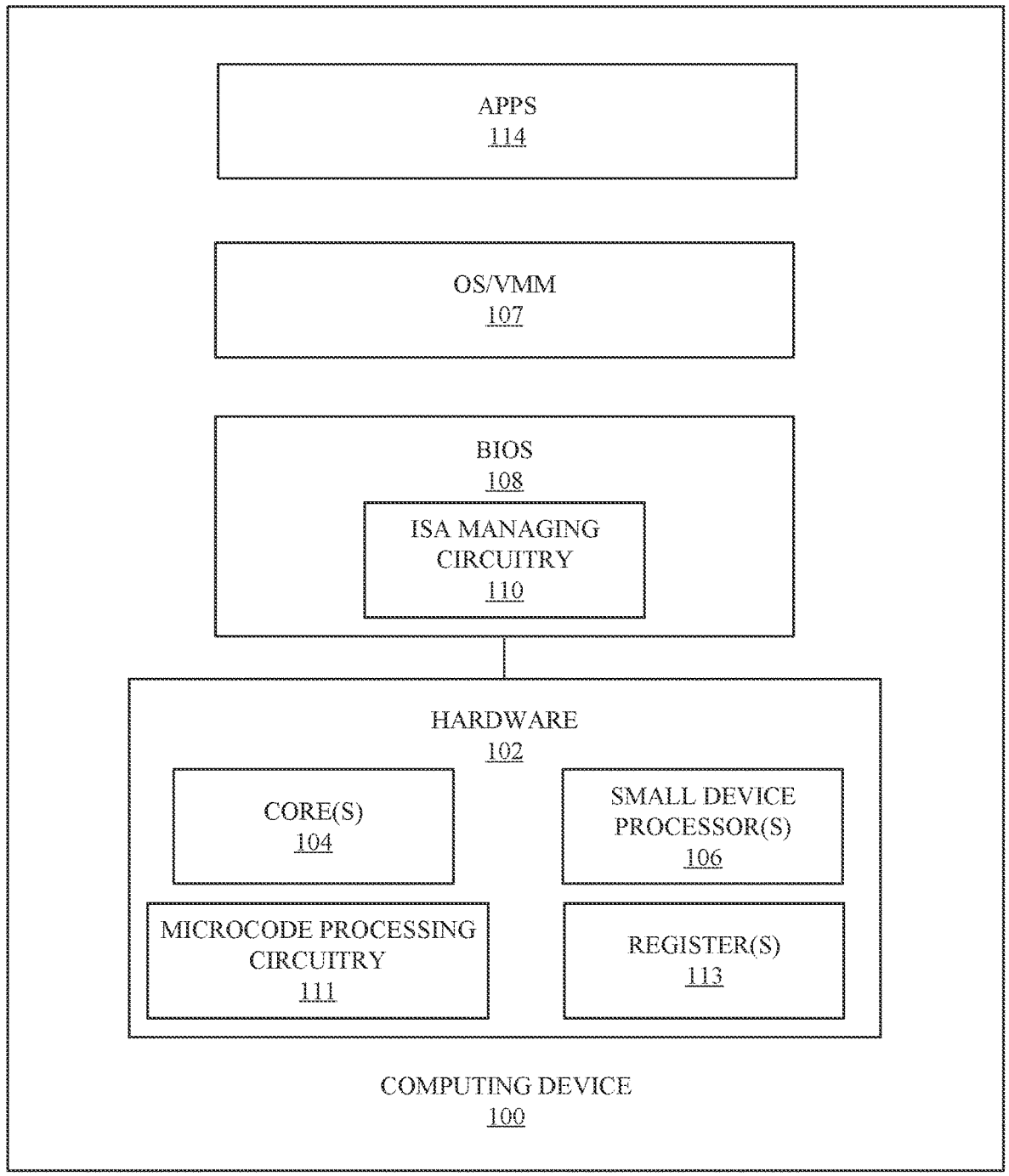
FIG. 1 is a block diagram of an example computing device.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Hardware-based microcode (also referred to as hardware level instructions) can be implemented in the hardware of a computing system (e.g., a computer, a laptop, a mobile phone, a server, an edge device, a cloud-based device, etc.) to configure the hardware of the computing system. In some examples, such hardware level instructions (e.g., uCode, XuCode, etc.) can control operation of the hardware, including processing devices. If a computing device includes multiple processing devices (e.g., big cores, little cores, atoms, central processing unit (CPU) sockets, CPU, slots, etc.), the microcode can facilitate the operation and/or configuration of the multiple processing devices.

As the number and/or types of architectures increase, the difficulty in programming instructions increases because there may need to be a separate configuration of instructions for each type of architecture. For example, instructions may be 124 bit instructions structured to be executed by hardware that can handle the 124 bit instructions. Similarly, a system with multiple smaller processing units that handle 64 bit instructions will not be able execute instructions above 64 bits.

Examples disclosed herein provide a software and/or firmware based application programming interface (API) to process instructions from an application running on an operating system, virtual machine manager (VMM), etc., and instruct microcode to configure the processing units to be able to execute the instructions, regardless of how the instructions are structured. For example, if a 512-bit instruction is obtained from an application, examples disclosed herein can configure eight 64-bit processing units to break up the 512-bit instruction into eight 64-bit instructions, execute the 64-bit instructions in parallel, and combine the results, thereby operating as a conditionally activated big core (e.g., a big core capable of handing the 512 bit instruction). In this manner, the application can generate one instruction and examples disclosed herein can determine if and/or how to execute the instruction given the constraints of the computing system via which it is to be executed.

The example disclosed API obtains ISA instructions from the OS/VMM. An ISA instruction is an instruction that calls for multiple processing devices to operate as a single big processing device capable of handing the ISA instruction. When the disclosed API obtains an ISA request to execute ISA instructions from an application (e.g., as an interrupt), the API first determines if the processing units are capable and/or available to execute the instructions while meeting the service level agreements (SLAs), latency requirements, tolerance requirements, etc. corresponding to the instructions. If the API determines that the processing units are capable and available to execute the instructions while meeting the requirements, the API instructs the microcode to cause the processing units to execute the instructions according to the requirements. If the API determines that the processing units are capable but not available to execute the instruction, the API may indicate (1) (e.g., to the application) when the processing units will be available (e.g., an approximation of when a currently implemented workload will be complete) and/or (2) that the big core can be emulated, but the requirements may not be met. In this manner, the application can determine whether to wait to execute the instruction to meet the requirements, proceed with emulation while not meeting one or more of the requirements, or not to execute the instruction with the corresponding processing elements. If the API determines that the processing units are not capable of executing the instruction, the API indicates (e.g., to the application), that the instruction cannot be executed.

FIG. 1 is a block diagram of an example computing device 100. The example computing device 100 includes example hardware 102, which includes one or more example cores 104, one or more example small device processors 106, example microcode processing circuitry 111, and example register(s) 113. The example computing device 100 further includes example BIOS 108 that includes example ISA managing circuitry 110. The example computing device 100 further includes an example operating system (OS)/virtual machine manager (VMM) 107 and example applications (APPS) 114.

The example hardware 102 of FIG. 1 performs tasks corresponding to instructions from the applications 114, OS/VMM 122 and/or BIOS 108. The example hardware 102 may include processor resources (e.g., memory, register(s) and/or logic circuitry of the example processor core(s) 104 and/or small device processor(s) 106) to execute instructions to implement the instructions of the example applications 114 and/or access data from memory.

The example processor core(s) 104 and/or the example small device processor(s) 106 of FIG. 1 execute(s) instructions (e.g., a workload) from an application (e.g., by reading and/or writing data). Tasks executed on one or more core(s) 104 may result in a different amount of time to complete and/or a different efficiency than the same tasks being executed on the one or more small device processors 106. For example, the one or more cores 104 may be more efficient with respect to iterations per cycle (IPC) ratios when executing compute-bound tasks. Additionally, the one or more cores 104 may have a larger cache than the small device processors 106 for executing cache bound tasks. The one or more small device processors 106 may be more efficient for memory-bound tasks that correspond to more time in pipe stall waiting for memory and/or may be more efficient for I/O bound tasks, as IO bound tasks do not depend on processing operating speed. Although the example hardware 102 includes the core(s) 104 and the small device processor(s) 106, the hardware 102 can include any number and/or type of processing components (e.g., little core, big core, threads, etc.). Examples of small device processors 106 include Intel® Atom®, Intel® Quark® SoC, LITTLE cores, etc. As further described above, two or more of the core(s) 104 and/or the small device processor(s) 106 may work together (e.g., based on instructions from the ISA managing circuitry 110 and/or the microcode processing circuitry 111) to split a large instruction into sub-instructions and execute on corresponding processing devices. In this manner, the application 114 and/or OS/VMM 107 can transmit a single instruction that a single core or small device processor cannot execute alone and the core(s) 104 and/or small device processors(s) 106 can work together as a bigger computing device to execute the single instruction.

The example OS/VMM 107 of FIG. 1 is a software system managing the example hardware 102 of the computing device 100, software resources, and/or provides servers for computer programs and/or applications. The OS/VMM 107 of FIG. 1 transmits instructions and/or an ISA execution request to the ISA managing circuitry 110 to cause the ISA managing circuitry 110 to control the processing resources (e.g., the core(s) 104 and/or the small device processor(s) 106) to operate as a big core. In some examples, the OS/VMM 107 stores the instructions and/or ISA execution request in the example register(s) 113 that the ISA managing circuitry 110 monitors. In this manner, the OS/VMM 107 can cause an interrupt to occur for facilitation of the ISA execution when new data is placed in the register 113.

The example BIOS 108 of FIG. 1 provides low-level control over the hardware 102 of the computing device 100. For example, the BIOS 112 to may use the example core(s) 104 and/or small device processor(s) 106 to execute instructions and/or perform operations to operate as a big core. The BIOS 108 can perform hardware initialization and/or provide runtime services for the OS/VMM 107 and/or other programs. Although the example computing device 100 of FIG. 1 includes the BIOS 108, the BIOS 108 can be replaced with EFI, UEFI, and/or any other type of firmware that is capable of interfacing between hardware and the OS/VMM 107. The example BIOS 108 includes the example ISA managing circuitry 110.

The example ISA managing circuitry 110 of FIG. 1 obtains instructions (e.g., to perform an ISA execution with processor resources operating as a big core) from the application via the OS/VMM 107. In some examples, the ISA managing circuitry 110 determines that the OS/VMM 107 has requested the processing components of the hardware 102 to operate as a big core by monitoring a change in data in one or more registers 113 of the hardware 102. For example, the OS/VMM 107 may, when it requires or requests big core operation, place data in the one or more registers 113 to indicate the big core operation (e.g., as an interrupt). Thus, the ISA managing circuitry 110 may monitor the register 113 (e.g., like an interrupt) to determine when to facilitate the big core operation.

When the example ISA managing circuitry 110 of FIG. 1 determines that big core operation is to occur, the ISA managing circuitry 110 determines the ISA requirements (SLAs, latency requirements, tolerance requirements, etc.) of the instructions that are to be executed by the big core structure. For example, if the instructions are stored in one or more of the register(s) 113, the ISA managing circuitry 110 processes the ISA instructions to identify the requirements. The ISA managing circuitry 110 evaluates whether the processing resources (e.g. one or more of the core(s) 104 and/or the small device processing components 106) are capable and/or available to handle ISA execution as a big core according to the determined requirements. In some examples, because the processing resources may be executing other workloads, one or more of the processing resources may be capable of handing the ISA execution but not currently available to execute the instructions. In some examples, the processing resources may not be capable of handling the ISA execution. For example, the processing resources may be structured to handle integer based instructions. In such an example, if the OS/VMM 107 transmit instructions to handle a floating point number, the processing resources may not be capable of handling such a resource. Accordingly, the example ISA managing circuitry 110 determines whether the processing resources are available and/or capable of executing instructions from the OS/VMM 107 corresponding to the ISA execution.

If the example ISA managing circuitry 110 of FIG. 1 determines that the processing resources are capable and available to execute the ISA execution by combining operation of multiple ones of the core(s) 104 and/or the smaller processing components 106 to operate as a big core, the example ISA managing circuitry 110 instructs the microcode processing circuitry 111 of the hardware 102 to cause the core(s) 104 and/or the smaller processing components 106 to operate as a big core. If the example ISA managing circuitry 110 of FIG. 1 determines that the processing resources are capable but not available to execute the instructions (e.g., only a portion of the processing resources is available), the example ISA managing circuitry 110 can (a) determine when sufficient processor resources will be available to operate as a big core (e.g., based on when a current workload and/or scheduled workload(s) will be complete) and/or (b) whether emulation of the big core is possible. The combination of small devices processors that are capable of acting as a bigger processing device is policy configurable and may be enforced via a platform trusted execution environment (TEE). Emulation is possible when the available processor resources are capable of executing as a big core but the execution will not satisfy all of the requirements. For example, the ISA managing circuitry 110 may determine that a 512 bits per cycle is not possible, but a 256 bits per cycle is possible. In such an example, the 512 bit instruction could be performed in two 256 bit cycles as opposed to one 512 bit cycle. Accordingly, although the instruction can be complete, it will be complete at half the 512 bit cycle requirement. The example ISA managing circuitry 110 may transmit the information regarding emulation and/or when additional resources will be available to the example OS/VMM 107. In this manner, the OS/VMM 107 can determine whether to wait, proceed with emulation, and/or not move forward based on the information from the ISA managing circuitry 110. In some examples, the OS/VMM 107 and the ISA managing circuitry 110 can negotiate terms for emulation. If the example ISA managing circuitry 110 determines that the processor resources are not capable of operating as a big core and/or not capable of executing the instruction, the ISA managing circuitry 110 can generate an exception (e.g., also referred to as a trap and/or block) for the ISA execution and inform that OS/VMM 107 that it will not execute the instruction because it is not capable. The example ISA managing circuitry 110 is further described below in conjunction with FIG. 2.

The example microcode processing circuitry 111 of FIG. 1 is hardware that executes microcode (e.g., Xucode, etc.) to control operation of the example core(s) and/or small device processor(s) 106. For example, if the small device processor(s) 106 are 64 bit per cycle processors and the ISA managing circuitry 110 instructs the microcode processing circuitry 111 to operate as a big core executing a 512 bit per cycle instruction, the microcode processing circuitry 111 will split the 512 bit instruction into eight 64 bit instructions, cause eight of the 64 bit cycle small device processors 106 to execute a corresponding 64 bit instruction and combine the results to output a result. For example, the microcode processing circuitry 111 can divide and/or group the instruction into smaller parts or sub-instructions. The smaller sub-instruction are loaded into the smaller device processors 106 and the microcode processing circuitry 111 does a combination of accumulation in the larger register space of a temporary storage (e.g., a virtual register). For example, if the small device processors 106 only support 256-bit width, a 512 bit operation is obtained, and the small device processors 106 have a 512 bit accumulation register, the small device processors 106 can use the accumulation register and/or configure the accumulation register can be configured in SRAM for the operation Additional operations may include multiplication, additive encryption, etc. In this manner, the 512 bit instruction can be executed by eight small device processors acting as a big core. If the microcode processing circuitry 111 identifies an error during the execution, the microcode processing circuitry 111 can return an error to the ISA managing circuitry 110 to identify that the ISA execution failed and prevent a crash. The example microcode processing circuitry 111 is further described below in conjunction with FIG. 2.

Figure 2:
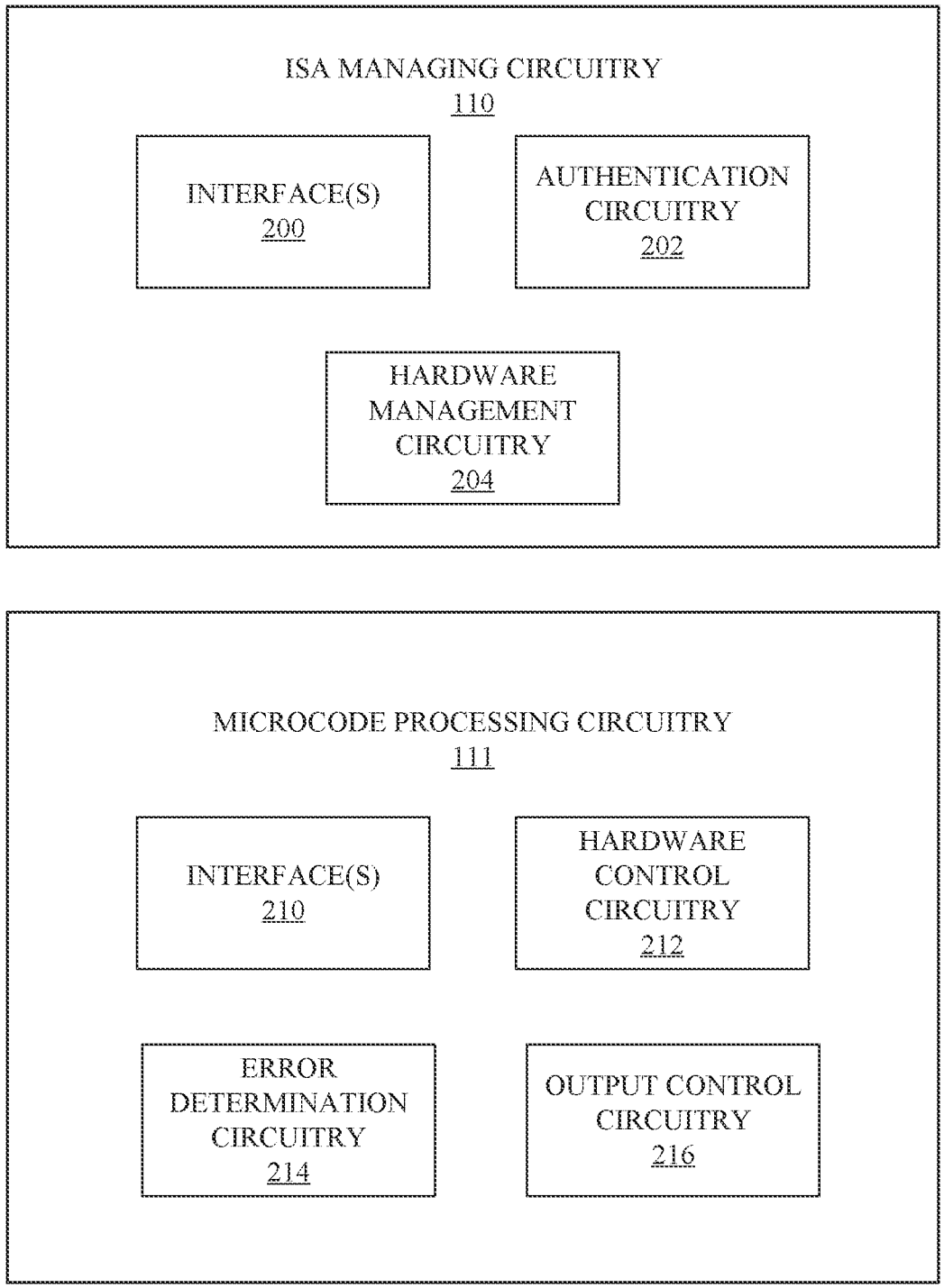
FIG. 2 is a block diagram of an implementation of the example instructions set architecture (ISA) managing circuitry and the microcode processing circuitry of FIG. 1.

FIG. 2 is a block diagram of an example implementation of the example ISA managing circuitry 110 and the microcode processing circuitry 111 of FIG. 1. The example ISA managing circuitry 110 includes one or more example interface(s) 200, example authentication circuitry 202, and example hardware management circuitry 204. The example microcode processing circuitry 111 includes one or more example interface(s) 210, example hardware control circuitry 212, example error determination circuitry 214, and example output control circuitry 216.

The example interface(s) 200 of the ISA managing circuitry 110 of FIG. 2 obtain(s) instructions to perform an ISA execution by using multiple processing devices to operate as a big core. In some examples, the ISA managing circuitry 110 obtains the instructions directly from the OS/VMM 107 of FIG. 1. In some examples, the OS/VMM 107 writes data into the register 113 when ISA execution is desired. In such examples, the interface(s) 200 access the data in the register 113 to allow the hardware management circuitry 204 to determine whether ISA execution is possible. Additionally, the example interface 200 transmits instructions to the microcode processing circuitry 111 to cause the processing resources to operate according to the ISA execution request from the OS/VMM 107.

The example authentication circuitry 202 of FIG. 2 authenticates ISA execution requests and/or instructions to verify that a request is valid and/or authentic. To verify an ISA execution request, the example authentication circuitry 202 may (a) match the CPU in the platform, (b) check the header, loader version, and/or checksum of the ISA execution request, (c) perform the authenticity and/or signature check pass, and/or (d) utilize any validation technique. The example authentication circuitry 202 can match the CPU in the platform with provisioned CPU ID/Manifest via factory provisioning during manufacturing (e.g., fuse settings) or field provisioning via a firmware/microcode patch. The CPU matching can be controlled dynamically post deployment in the filed via policies and/or out-of-the-band manageability via platform trusted execution environment (TEE). If the ISA execution request is not valid and/or authentic, the authentication circuitry 202 may inform the OS/VMM 107 that the ISA execution request could not be validated and/or return control to the OS/VMM 107.

The example hardware management circuitry 204 of FIG. 2 obtains validated ISA execution requests and determines how to execute the ISA execution requests based on the requirements of the ISA execution request, the availability and/or capability of the processing resources (e.g., the core(s) 104 and/or the small device processor(s) 106), and any policies. A policy may be a user and/or manufacturer designed policy that identifies whether an ISA execution should be executed, should be emulated, and/or should be blocked based on various factors. The hardware management circuitry 204 monitors the capability and/or the availability of the processor resources (e.g., the core(s) 104 and/or the small device processor(s) 106). If an ISA request corresponds to executing an X bits per cycle instruction that includes a floating point operation, the hardware management circuitry 204 determines whether the processing resources are available and capable of handing the ISA execution request at X bits per cycle for a floating point operation. For example, if the total bits per cycle provided by two or more available processor resources capable are equal to or exceed the the X bits per cycle, the hardware management circuitry 204 may determine that ISA execution is available and instruct the microcode processing circuitry 111 to coordinate the execution of the ISA execution as a big core using the two or more processor resources (e.g., the core(s) 104 and/or the small device processor(s) 106).

Additionally, the example hardware management circuitry 204 of FIG. 2 may determine that two or more processor resources are capable of performing the floating point operation, but not according to the requirements of the ISA execution. If the hardware management circuitry 204 determines that the ISA execution requirements cannot be met, the hardware management circuitry 204 can identify when the requirements can be met and/or may generate an emulation protocol to execute the ISA request but not according to the requirements. In this manner, the hardware management circuitry 204 can negotiate with the OS/VMM 107 to determine whether to proceed with emulation, not proceed, and/or wait until additional resources are available. If the hardware management circuitry 204 determines that the ISA execution is not possible and/or may not be possible in the future, the hardware management circuitry 204 transmits a response (e.g., via the interface(s) 200) to the OS/VMM 107 to indicate that the ISA execution is not possible. If the example hardware management circuitry 204 determines that the processing resources are not able to handle the ISA execution request (e.g., regardless of the availability), the example hardware management circuitry 204 generates an exception of ISA execution block to prevent execution of the ISA execution and indicates that the processing resources are not capable of executing the ISA execution to the example OS/VMM 107. After the hardware management circuitry 204 determines how to handle the ISA execution request, the hardware management circuitry 204 instructs the microcode processing circuitry 111 to control the processing resources accordingly.

The example interface 210 of the microcode processing circuitry 111 of FIG. 2 obtains instructions regarding the execution of ISA execution request from the ISA managing circuitry 110. Additionally, the example interface(s) 210 obtains ISA-based instructions for ISA execution. After the ISA instructions are complete, the interface(s) 210 transmit the output to the OS/VMM 107 (e.g., directly or via the BIOS 108).

The example hardware control circuitry 212 of FIG. 2 determines how to structure the processing resources (e.g., the example core(s) 104 and/or the example small device processor(s) 106) to execute the ISA execution based on the instructions from the ISA managing circuitry 110. For example, the hardware control circuitry 212 may break an ISA instruction into sub-instructions that can be executed by the available processing resources and provide the sub-instructions to the corresponding processing resources (e.g., via the interface(s) 210). For example, if a 128 bit instruction is obtained, the hardware control circuitry 212 may break the 128 bit instruction into two 64 bit sub-instructions to be executed by two 64-bit small device processors (e.g., the first sub-instruction to the first small device processor and the second sub-instruction to the second small device processor). In this manner, the processing resources can execute the larger instruction without the use of a larger processing resource.

The example error determination circuitry 214 of FIG. 2 monitors the execution of the ISA execution for errors. For example, if an instruction results in a divide by zero, infinite loop, and/or other instruction error, the error determination circuitry 214 can identify the error, stop execution, and return a message to the OS/VMM 107 indicating that the instruction execution could not be completed. In this manner, the error determination circuitry 214 can prevent crashes from occurring.

The example output control circuitry 216 of FIG. 2 obtains the multiple outputs from the multiple processing resources and combines the outputs to generate a single output. For example, if the hardware control circuitry 212 split a 128 bit instruction into two 64 bit instructions for two 64-bit processing resources, the output control circuitry 216 obtains the first output from the first processing resource and the second output from the second processing resource and combines the outputs to generate a 128 bit output. The output control circuitry 216 transmits the output to the OS/VMM 107 via the interface(s) 210.

While an example manner of implementing the ISA managing circuitry 110 and/or the microcode processing circuitry 111 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface(s) 200, the example authentication circuitry 202, the example hardware management circuitry 204, the example interface(s) 210, the example hardware control circuitry 212, the example error determination circuitry 214, the example output control circuitry 216, and/or, more generally, the ISA managing circuitry 110 and/or the microcode processing circuitry 111 of FIGS. 1-2, may be implemented by hardware, software, firmware, and/or any combination of hardware, software, and/or firmware. Thus, for example, any of the example interface(s) 200, the example authentication circuitry 202, the example hardware management circuitry 204, the example interface(s) 210, the example hardware control circuitry 212, the example error determination circuitry 214, the example output control circuitry 216, and/or, more generally, the ISA managing circuitry 110 and/or the microcode processing circuitry 111 of FIGS. 1-2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the ISA managing circuitry 110 and/or the microcode processing circuitry 111 of FIGS. 1-2 is/are hereby expressly defined to include a non-transitory computer readable storage device or storage disk such as a memory, a digital versatile disk (DVD), a compact disk (CD), a Blu-ray disk, etc., including the software and/or firmware. Further still, the ISA managing circuitry 110 and/or the microcode processing circuitry 111 of FIGS. 1-2 may include one or more elements, processes, and/or devices in addition to, or instead of, those illustrated in FIGS. 1-3, and/or may include more than one of any or all of the illustrated elements, processes, and devices.

Figure 3:
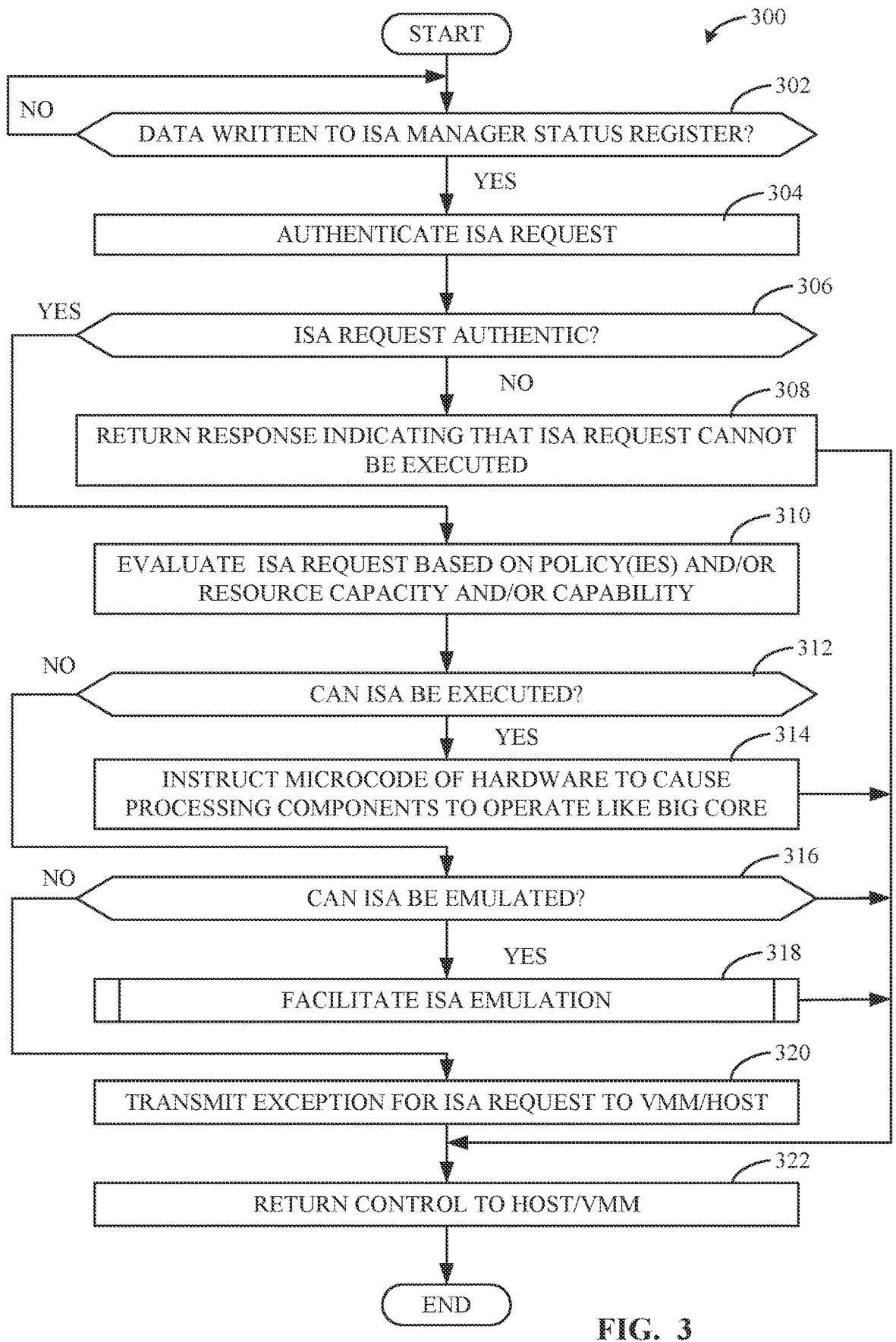
FIGS. 3 and 4 are flowcharts representative of example machine readable instructions that may be executed by example processor circuitry to implement the ISA managing circuitry of FIG. 2.
Figure 4:
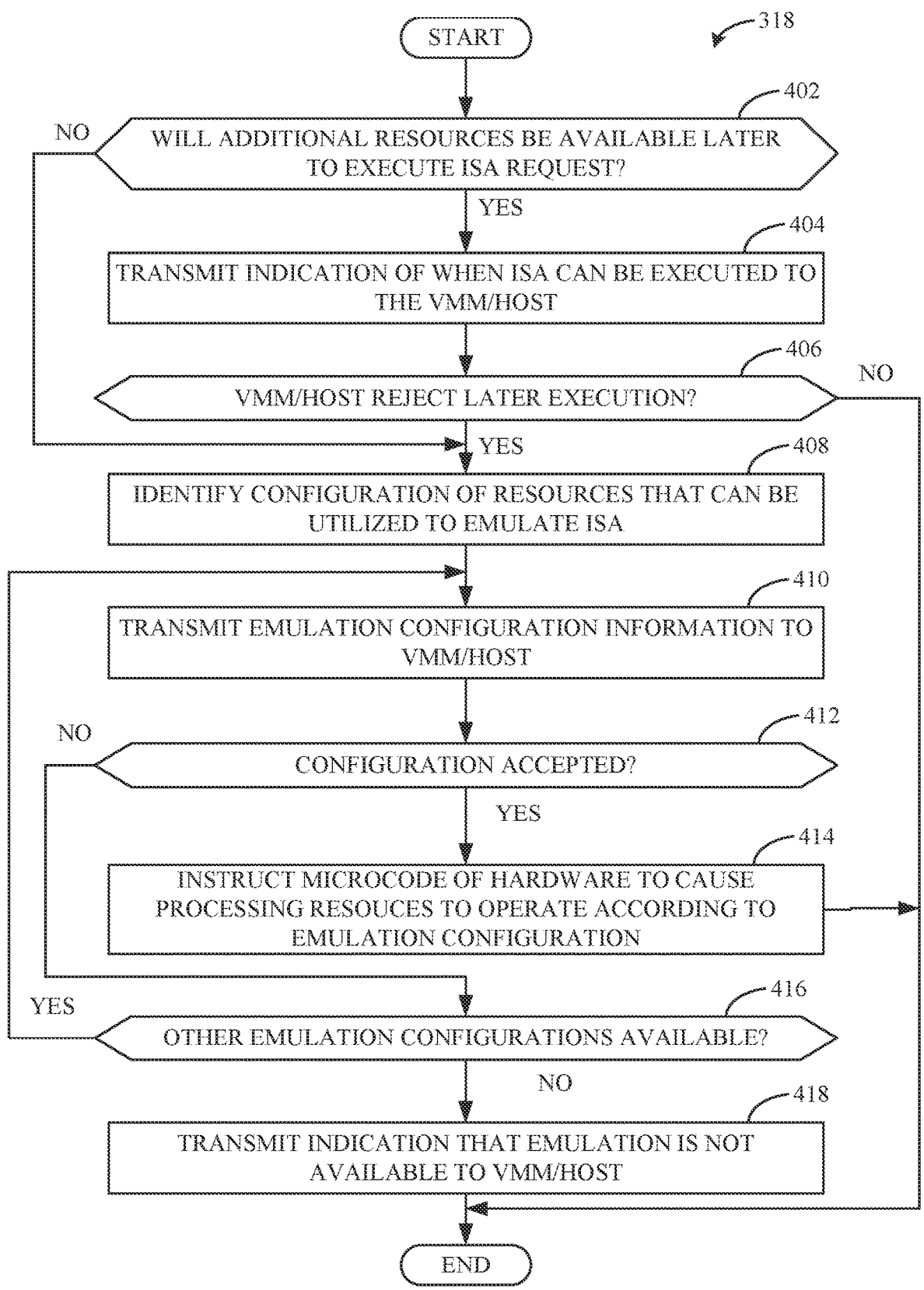
Figure 5:
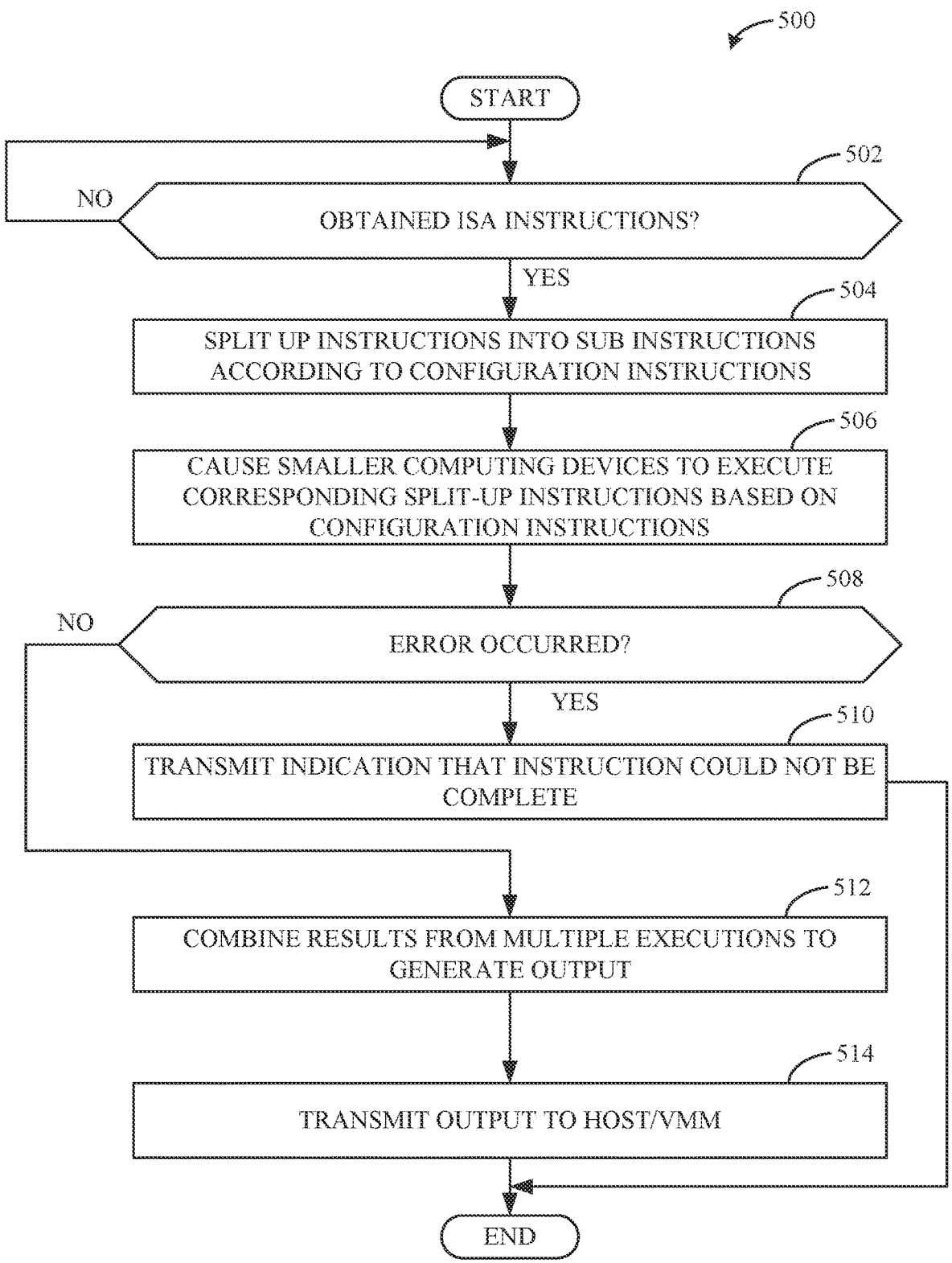
FIG. 5 is a flowchart representative of example machine readable instructions that may be executed by example processor circuitry to implement the microcode processing circuitry of FIG. 2.

Flowcharts representative of example hardware logic circuitry, machine readable instructions, hardware implemented state machines, and/or any combination thereof for implementing the ISA managing circuitry 110 and/or the microcode processing circuitry 111 of FIGS. 1-2 are shown in FIGS. 3-5. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIG. 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 2, many other methods of implementing the computing device 100, the ISA managing circuitry 110, and/or the microcode processing circuitry 111 of FIGS. 1-2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry (e.g., the example ISA managing circuitry 110 of FIG. 2) to handle an ISA execution request. The instructions begin at block 302 when the example hardware management circuitry 204 determines if data has been written into the ISA manager status register (e.g., one or more of the registers 113 of FIG. 1). As described above, the OS/VMM 107 may write data into the register 113 to set off an interrupt when an ISA execution is to occur. In some examples, the OS/VMM 107 may transmit the instructions directly to the ISA managing circuitry 110.

If the example hardware management circuitry 204 determines that data has not been written to the ISA manager status register 113 (block 302: NO), control returns to block 302. If the example hardware management circuitry 204 determines that data has been written to the ISA manager status register 113 (block 302: YES), the example authentication circuitry 202 authenticates the ISA execution request corresponding to the data in the ISA manager status register 113 (block 304). As described above in conjunction with FIG. 2, the example authentication circuitry 202 can authenticate the ISA request using any authentication technique to determine that the ISA execution request is valid.

If the example authentication circuitry 202 determines that the ISA request is not authentic (block 306: NO), the authentication circuitry 202 returns a response to the OS/VMM 107 indicating that the ISA request cannot be executed (block 308) and control continues to block 322. If the example authentication circuitry 202 determines that the ISA request is authentic (block 306: YES), the example hardware management circuitry 204 evaluates an ISA request based on one or more polarities, resource capacity, and/or resource capability (block 310). For example, the hardware management circuitry 204 may process one or more policies to determine how to handle the request and/or may determine whether the available processor resources are capable of handing the request.

At block 312, the example hardware management circuitry 204 determines whether the ISA can be executed per the requirements corresponding the ISA execution (e.g., latency, bit rate, etc.) and/or per the one or more policies. For example, the hardware management circuitry 204 determines whether the processor resources are capable and/or available to handle the ISA execution. If the hardware management circuitry 204 determines that the ISA request can be executed by the processor resources (block 312: YES), the example hardware management circuitry 204 instructs the microcode of the hardware (e.g., the microcode ISA managing circuitry 111) to cause the processing components to operate like a big core to handle the ISA execution (block 314). For example, the hardware management circuitry 204 can provide the ISA execution instructions and/or requirements to the microcode to cause the microcode to facilitate the ISA execution with the corresponding processor resources.

If the hardware management circuitry 204 determines that the ISA request cannot be executed by the processor resources (block 312: NO), the example hardware management circuitry 204 determines whether the processor resources can emulate the ISA execution and/or execute the ISA request at a later time (block 316) (e.g., based on policy(ies), resource capability, and/or resource availability). If the example hardware management circuitry 204 determines that emulation should occur (block 316: YES), the example ISA managing circuitry 110 facilitates execution of ISA emulation (block 318), as further described below in conjunction with FIG. 4.

If the example hardware management circuitry 204 determines that emulation should not occur (block 316: NO), the example hardware management circuitry 204 creates an exception for and/or blocks the ISA request to the VMM/host 106 (e.g., via the interface(s) 200) to indicate that the ISA request cannot be executed (block 320). At block 322, the example hardware management circuitry 204 returns control to the example OS/VMM 107.

FIG. 4 is a flowchart representative of example machine readable instructions and/or example operations that may be executed and/or instantiated by processor circuitry (e.g., the ISA managing circuitry 110 of FIG. 2) to facilitate ISA emulation, in conjunction with block 318 of FIG. 3.

The machine readable instructions and/or operations corresponding to block 318 of FIG. 4 begin at block 402, when the example hardware management circuitry 204 determines whether additional resources will be available later to execute the ISA execution corresponding to the ISA request. For example, the hardware management circuitry 204 may determine whether additional hardware (e.g., sufficient resources to execute the ISA execution according to and/or more closely aligned with the policy(ies) and/or parameter(s)) are currently executing one or more workload(s), but will be free for the ISA execution after the one or more workloads are complete.

If the example hardware management circuitry 204 determines that additional resources will not be available later to execute the ISA execution corresponding to the ISA request (block 402: NO), control continues to block 408. If the example hardware management circuitry 204 determines that that additional resource will be available later to execute the ISA execution corresponding to the ISA request (block 402: YES), the example hardware management circuitry 204 instructs the interface(s) 200 to transmit an indication of when the ISA instructions can be executed by the processor resources to the example OS/VMM 107 (block 404). For example, the hardware management circuitry 204 may determine and/or estimate when the currently unavailable processor resource will be available based on the speed of the currently unavailable resources and the amount of workload left to complete.

At block 406, the example hardware management circuitry 204 determines whether the OS/VMM 107 has rejected the later execution based on a response from the OS/VMM 107. For example, after the indication is sent to the OS/VMM 107 regarding when the processing resources will be available, the OS/VMM 107 can determine whether it wants to wait for full execution for the ISA instructions or move forward with immediate emulation. In some examples, if the OS/VMM 107 determines to wait for the additional resources to become available (e.g., based on user and/or manufacturer preferences that indicate when to wait for the resources to be fully available if not currently avaiable), control can return to the OS/VMM 107 and the OS/VMM 107 can submit a subsequent request based on the identified time when the resources will be available. In some examples, if the OS/VMM 107 decides to wait for the additional resources to become available, the hardware management circuitry 204 can reserve and/or queue the ISA instruction for the currently unavailable resources to execute the ISA instructions after the workload is complete.

If the example hardware management circuitry 204 determines that the OS/VMM 107 did not reject the later execution (block 406: NO), control returns to block 322 of FIG. 3. If the example hardware management circuitry 204 determines that the OS/VMM 107 did reject the later execution (block 406: YES), the example hardware management circuitry 204 identifies a configuration of resources that can be utilized to emulate the ISA. For example, if there are two available small device processors with a 64 bit rate and the ISA instructions corresponds to a 256 bit instruction, the hardware management circuitry 204 may identify a configuration using the two small device processors to execute the instructions at half the bit rate (e.g., 128 bits per cycle*2 cycles=256 bits per 2 cycles). At block 410, the example hardware management circuitry 204 transmits the emulation configuration information to the OS/VMM 107 via the interface(s) 200. The emulation configuration information may include information related to the processor resources that will be used to emulate the ISA execution, the policies and/or parameters that will be met, the policies and/or parameters that will not be met, and/or the parameters of the emulation configuration (e.g., bit rate, latency, etc.).

At block 412, the example hardware management circuitry 204 determines if the configuration was accepted by the OS/VMM 107 (e.g., based on a response obtained from the OS/VMM 107 via the interface(s) 200). If the example hardware management circuitry 204 determines that the configuration was accepted (block 412: YES), the example hardware management circuitry 204 instructs the microcode of the hardware (e.g., the microcode processing circuitry 111) to cause the processing resources to operate according to the emulation configuration (block 414) and control returns to block 322 of FIG. 3. If the example hardware management circuitry 204 determines that the configuration was not accepted (block 412: NO), the example hardware management circuitry 204 determines whether other emulation configurations are available (block 416). In this manner, the example OS/VMM 107 and the ISA managing circuitry 110 can negotiate an emulation configuration. In some examples, the OS/VMM 107 may provide instructions and/or preferences that it would like to see in an emulation configuration and the ISA managing circuitry 110 can attempt to satisfy the instructions and/or preferences and/or provide an emulation configuration that better suits the instructions and/or preferences.

If the example hardware managing circuitry 204 determines that other emulation configurations are available (block 416: YES), control returns to block 410. If the example hardware managing circuitry 204 determines that other emulation configurations are not available (block 416: NO), the example hardware managing circuitry 204 transmits (e.g., to the OS/VMM 107 using the example interface(s) 200) an indication that the emulation is not available (block 418), and control returns to block 322.

FIG. 5 is a flowchart representative of example machine readable instructions and/or example operations 500 that may be executed and/or instantiated by processor circuitry (e.g., the microcode processing circuitry 111) to control the processing resources to handle execution of ISA instructions. The instructions begin at block 502 when the example hardware control circuitry 212 determines if ISA instructions have been obtained (e.g., from the OS/VMM 107 directly or via the BIOS 108).

If the example hardware control circuitry 212 determines that ISA instructions have not been obtained (block 502: NO), control returns to block 502 until ISA instructions are obtained. If the example hardware control circuitry 212 determines that the ISA instructions have been obtained (block 502: YES), the example hardware control circuitry 212 splits up the instructions into sub-instructions according to the configuration instruction from the ISA managing circuitry 110 (block 504). For example, if the configuration corresponds to one 128 bit processor and two 64 bit processors, the hardware control circuitry 212 may split a 256 bit instruction into a 128 bit instructions and two 64 bit instructions to correspond with the configuration, as further described above in conjunction with FIG. 1.

At block 506, the example hardware control circuitry 212 causes the processing resources to execute the split-up instructions based on the configuration instructions. Using the above example, the hardware control circuitry 212 may provide the 128 bit instruction to the processing resource that operates at 128 bits per cycle for execution, the first 64 bit instruction to the first processing resource that operates at 64 bits per cycle for execution, and the second 64 bit instruction to the second processing resource that operates at 64 bits per cycle for execution. At block 508, the example error determination circuitry 214 determines if an error has occurred at any of the processing resources. For example, the error determination circuitry 214 may identify operations that result in errors, infinite loops, etc.

If the example error determination circuitry 214 determines that an error has occurred (block 508: YES), the example error determination circuitry 214 transmits (e.g., using the interface(s) 210) an indication that the ISA instruction could not be complete (block 510) and the instructions end. If the example error determination circuitry 214 determines that an error has not occurred (block 508: NO), the example output control circuitry 216 combines the results (e.g., outputs) from the multiple executions at the multiple processor resources to generate the final output for the cycle (block 512), as further described above in conjunction with FIG. 1. For example, the output control circuitry 216 may combine the results (e.g., outputs) by concatenating the outputs, adding the outputs, multiplying the outputs, etc. If the ISA instruction corresponds to multiple instructions over multiple cycles, the microcode processing circuitry 111 may store the output for the cycle in memory (e.g., a register, cache, volatile memory, non-volatile memory, etc.) to use during a subsequent cycle and/or until all the instructions are complete and then combine some or all of the outputs of the cycles. At block 514, the example output control circuitry 216 uses the interface(s) 210 to transmit the outputs to the OA/VMM 107 (e.g., directly or via the BIOS 108).

Figure 6:
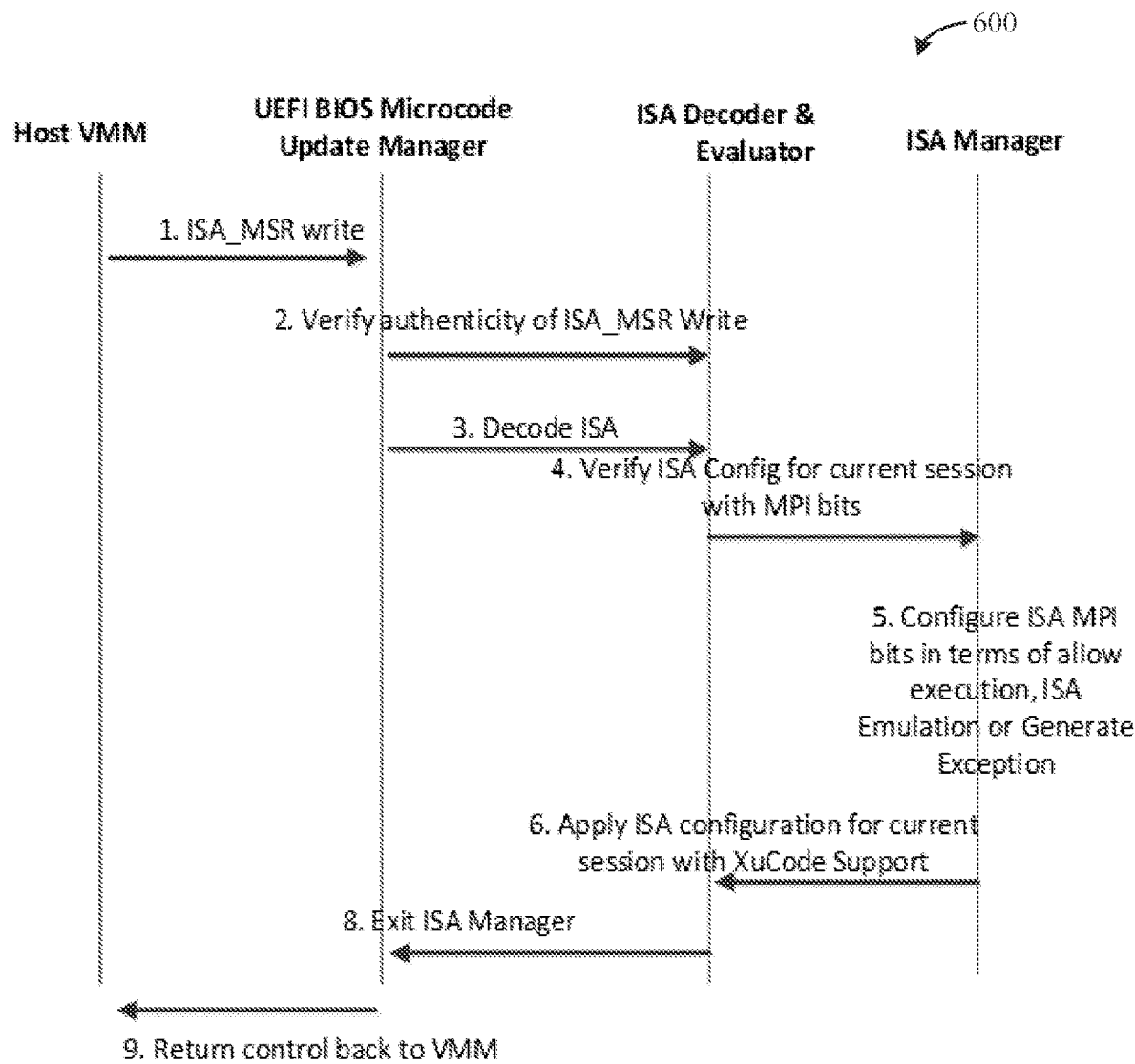
FIG. 6 is an example diagram representative of example operations that may be executed by the ISA managing circuitry of FIG. 2.

FIG. 6 illustrates an example diagram 600 corresponding to operation of the ISA managing circuitry 110 of FIG. 2. The example diagram 600 of FIG. 6 beings when the OS/VMM 107 writes data to the ISA manager status register (ISA_MSR) to initiate an interrupt for the ISA managing circuitry 110 to determine if and/or how to execute the ISA instructions according to the ISA execution request. When the ISA managing circuiting (e.g., implementing the UEFI BIOS microcode update manager) identifies the ISA MSR write, the authentication circuitry 202 (e.g., implementing the ISA decoder and/or evaluator) decodes and verifies the authenticity of the ISA MSR write. If authenticated, the hardware management circuitry 204 (e.g., implementing the ISA Manager) verifies the ISA configuration for the current session with message passage interface (MPI) bits, configures the ISA MPI bits in terms of allow execution, emulation, or generate exception, and applies the ISA configuration for the current session by instructing the Xucode (e.g., the microcode processing circuitry 111). In some examples, the hardware management circuitry 204 may take policy-based actions including generating new micro-ops using a surplus Mapper for execution to configure the processing resources to execute the ISA instructions. After complete, the example ISA managing circuitry 110 returns control back to the OS/VMM 107. To return back to normal thin mode (e.g., where the processing resources are not operating as a big core but as separate smaller processor devices), a similar process occurs.

Figure 7:
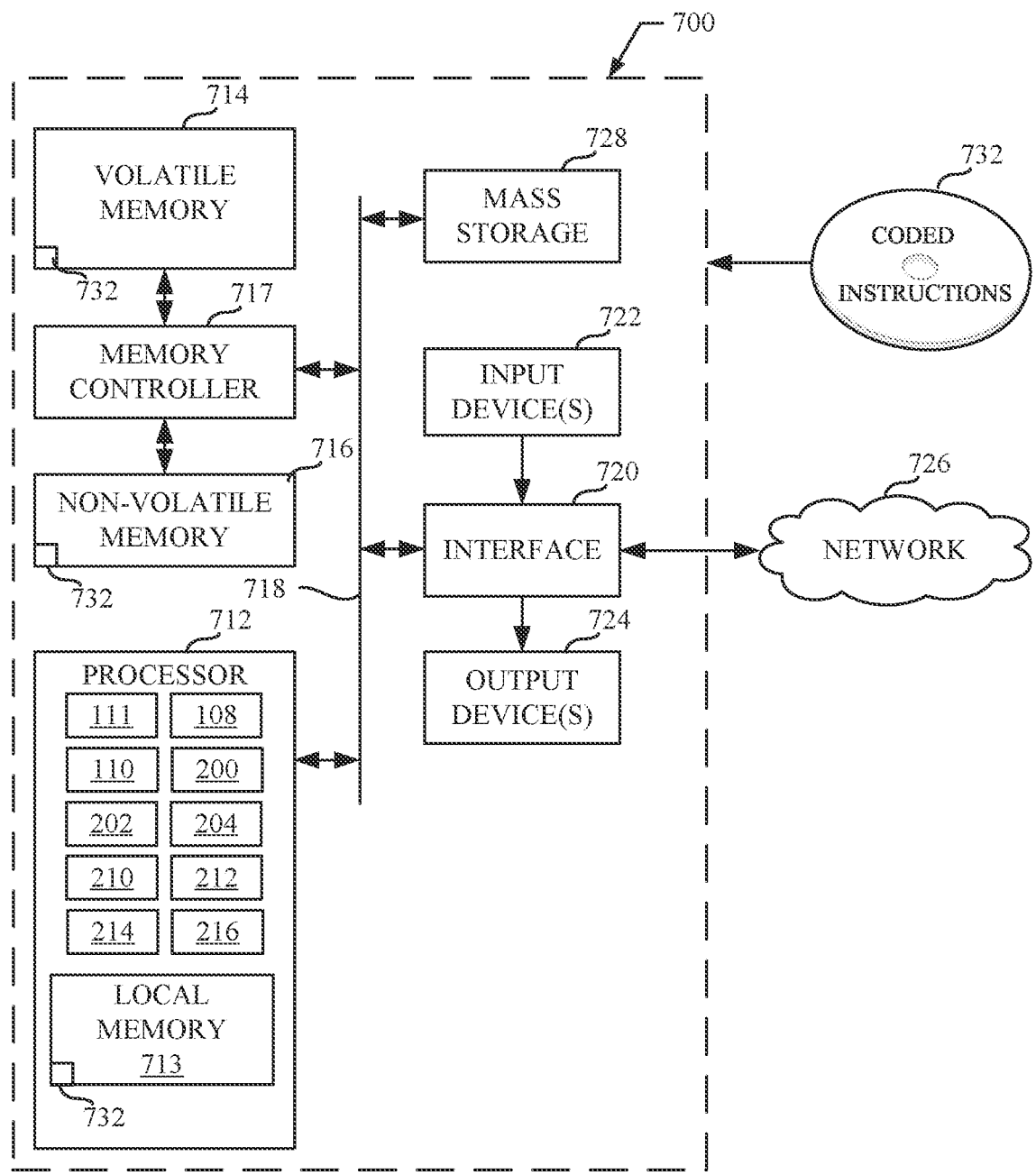
FIG. 7 is a block diagram of an example processing platform including processor circuitry structured to execute the example machine readable instructions of FIGS. 3-5 to implement the example computing device of FIG. 1.

FIG. 7 is a block diagram of an example processor platform 700 structured to execute and/or instantiate the machine readable instructions and/or operations of FIGS. 3-5 to implement the IA managing circuitry 110 and/or the microcode processing circuitry 111 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example interface(s) 200, the example authentication circuitry 202, the example hardware management circuitry 204, the example interface(s) 210, the example hardware control circuitry 212, the example error determination circuitry 214, and the example output control circuitry 216.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 3-5, may be stored in the mass storage device 728, in the volatile memory 714, in the non-volatile memory 716, and/or on a removable non-transitory computer readable storage medium such as a CD or DVD.

Figure 8:
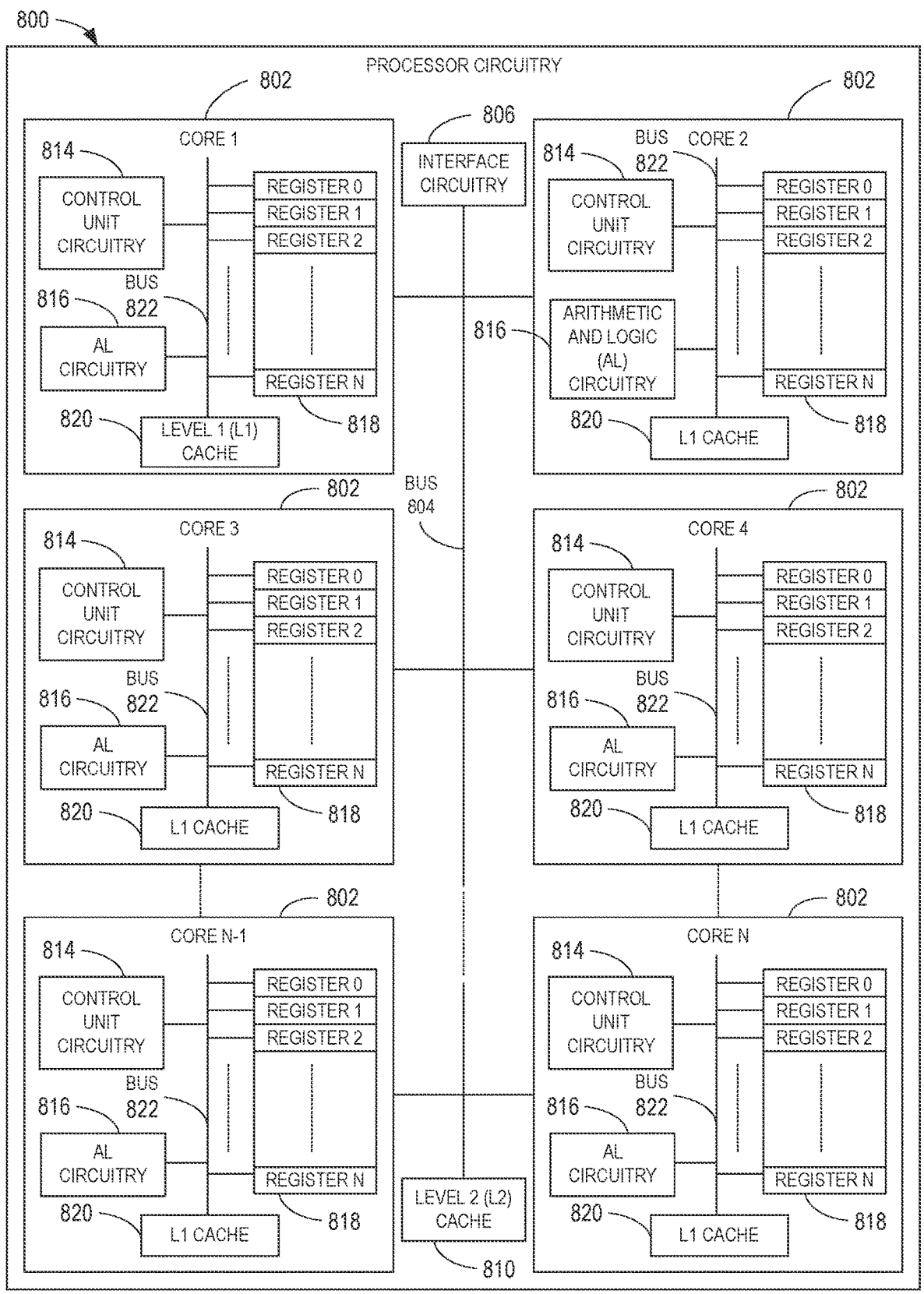
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor_00 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIGS. 4 and/or 5

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic, and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register (s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
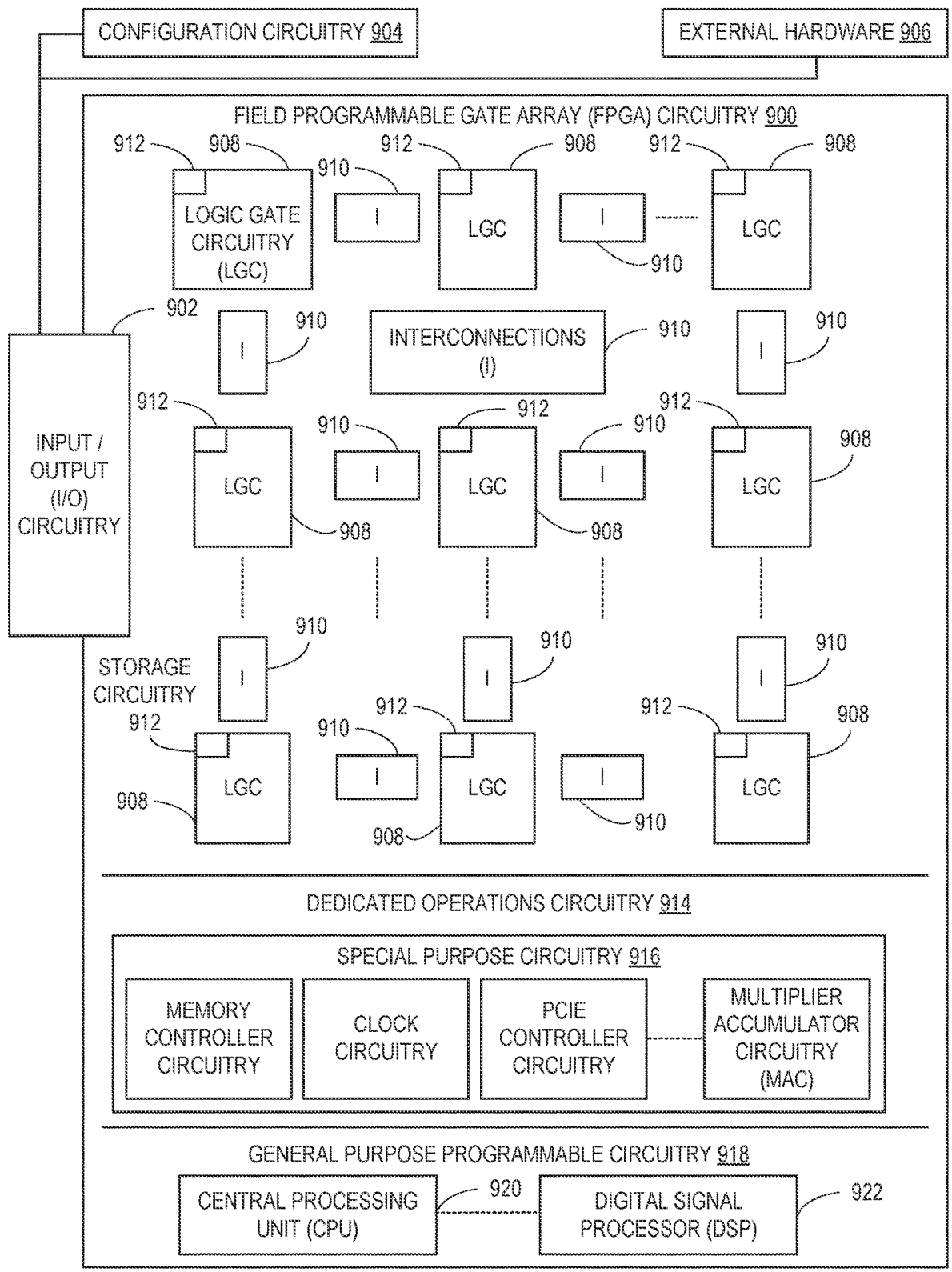
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 4-5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 4-5. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 4-5. As such, the FPGA circuitry 900 may be structured to effectively instantiate some or all of the machine readable instructions of the flowchart of FIG. 4-5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 9 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 4-5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 4-5 may be executed by one or more of the cores 802 of FIG. 8 and a second portion of the machine readable instructions represented by the flowchart of FIG. 4-5 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
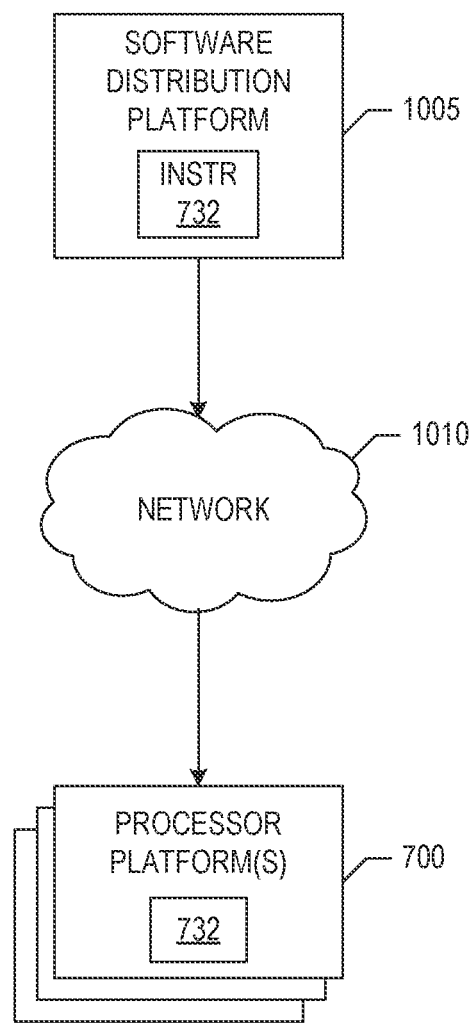
FIG. 10 is a block diagram of an example software distribution platform (e.g., one or more servers) to distribute software (e.g., software corresponding to the example machine readable instructions of FIGS. 3-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 400, 500 of FIGS. 3-5, as described above. The one or more servers of the example software distribution platform 1005 are in communication with a network 1010, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 400, 500 of FIG. 4-5, may be downloaded to the example processor platform 700, which is to execute the machine readable instructions 732 to implement the ISA managing circuitry 110 and/or the microcode processing circuitry 111. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

Example methods, apparatus, systems, and articles of manufacture to conditionally activate a big core in a computing system are disclosed herein. Further examples and combinations thereof include the following: Example 1 includes an apparatus to conditionally activate a big core in a computing system, the apparatus comprising first instructions in the apparatus, and processor circuitry to execute the first instructions to in response to a request to operate two or more processing devices as a single processing device, determine whether the two or more processing devices are available and capable of executing second instructions according to the request, when the two or more processing devices are available and capable of executing the second instructions split the second instructions into first sub-instructions and second sub-instructions, provide (a) the first sub-instructions to a first processing device of the two or more processing devices and (b) the second sub-instructions to a second processing device of the two or more processing devices, and generate an output for the second instructions by combining a first output of the first processing device and a second output of the second processing device.

Example 2 includes the apparatus of example 1, wherein the request is a first request, the processor circuitry to in response to a second request to operate the two or more processing devices as the single processing device, determine whether the two or more processing devices are available and capable of executing third instructions according to the second request, and when the two or more processing devices are capable of executing the third instructions but not available, determine whether the two or more processing devices will be capable of executing the third instructions at a subsequent point in time.

Example 3 includes the apparatus of example 2, wherein the processor circuitry is to, in response to determining that the two or more processing devices will be capable of executing the third instructions in the future, transmit a response indicating when the two or more processing devices will be available.

Example 4 includes the apparatus of example 1, wherein the request is a first request, the processor circuitry to in response to a second request to operate the two or more processing devices as the single processing device, determine whether the two or more processing devices are available and capable of executing second instructions according to a parameter associated with the second request, and when the two or more processing devices are capable of executing the third instructions but not available according to the parameter, generate an emulation configuration corresponding to execution of the third instructions based on the first processing device and the second processing device.

Example 5 includes the apparatus of example 4, wherein the processor circuitry is to transmit an indication that the third instructions can be executed according to the emulation configuration, and in response to an acceptance of the emulation configuration split up the third instructions into third sub-instructions and fourth sub-instructions, provide (a) the third sub-instructions to the first processing device of the two or more processing devices and (b) the fourth sub-instructions to the second processing device of the processing devices, and combine a third output of the first processing device and a fourth output of the second processing device.

Example 6 includes the apparatus of example 4, wherein the processor circuitry is to determine the two or more processing devices are capable of executing the third instructions but not available according to the parameter at a first time and determine the two or more processing devices are capable of executing the third instructions and available according to the parameter at a second time.

Example 7 includes the apparatus of example 1, wherein the processor circuitry is to transmit an indication that the first instructions cannot be executed when the two or more processing devices are not capable of executing the first instructions.

Example 8 includes the apparatus of example 1, wherein the processor circuitry is to authenticate the request prior to determining whether the two or more processing devices are available and capable of executing the first instructions according to the request.

Example 9 includes the apparatus of example 1, wherein the two or more processing devices are configurable to operate as different sized single processing devices.

Example 10 includes the apparatus of example 9, wherein a combination of the two or more processing devices is configurable via a policy.

Example 11 includes the apparatus of example 10, wherein the policy is enforced via a platform trusted execution environment.

Example 12 includes the apparatus of example 1, wherein the processing circuitry is to combine the first output of the first processing device and the second output of the second processing device by at least one of concatenating the first output and the second output, adding the first output and the second output, or multiplying the first output and the second output.

Example 13 includes a non-transitory computer readable medium comprising instructions which, when executed, cause one or more processors to at least in response to a request to operate two or more processing devices as a single processing device, determine whether the two or more processing devices are available and capable of executing instructions according to the request, when the two or more processing devices are available and capable of executing the instructions split the instructions into first sub-instructions and second sub-instructions, provide (a) the first sub-instructions to a first processing device of the two or more processing devices and (b) the second sub-instructions to a second processing device of the two or more processing devices, and generate an output for the instructions by combining a first output of the first processing device and a second output of the second processing device.

Example 14 includes the computer readable medium of example 13, wherein the request is a first request and the instructions are first instructions, the instructions to cause the one or more processors to in response to a second request to operate the two or more processing devices as the single processing device, determine whether the two or more processing devices are available and capable of executing second instructions according to the second request, and when the two or more processing devices are capable of executing the second instructions but not available, determine whether the two or more processing devices will be capable of executing the second instructions at a subsequent point in time.

Example 15 includes the computer readable medium of example 14, wherein the instructions cause the one or more processors to, in response to determining that the two or more processing devices will be capable of executing the second instructions in the future, transmit a response indicating when the two or more processing devices will be available.

Example 16 includes the computer readable medium of example 13, wherein the request is a first request and the instructions are first instructions, the instructions to cause the one or more processors to in response to a second request to operate the two or more processing devices as the single processing device, determine whether the two or more processing devices are available and capable of executing second instructions according to a parameter associated with the second request, and when the two or more processing devices are capable of executing the second instructions but not available according to the parameter, generate an emulation configuration corresponding to execution of the second instructions based on the first processing device and the second processing device.

Example 17 includes the computer readable medium of example 16, wherein the instructions cause the one or more processors to transmit an indication that the second instructions can be executed according to the emulation configuration, and in response to an acceptance of the emulation configuration split up the second instructions into third sub-instructions and fourth sub-instructions, provide (a) the third sub-instructions to the first processing device of the two or more processing devices and (b) the fourth sub-instructions to the second processing device of the processing devices, and combine a third output of the first processing device and a fourth output of the second processing device.

Example 18 includes the computer readable medium of example 16, wherein the instructions cause the one or more processors to determine the two or more processing devices are capable of executing the second instructions but not available according to the parameter at a first time and determine the two or more processing devices are capable of executing the second instructions and available according to the parameter at a second time different than the first time.

Example 19 includes the computer readable medium of example 13, wherein the instructions cause the one or more processors to transmit an indication that the instructions cannot be executed when the two or more processing devices are not capable of executing the instructions.

Example 20 includes the computer readable medium of example 13, wherein the instructions cause the one or more processors to authenticate the request prior to determining whether the two or more processing devices are available and capable of executing the instructions according to the request.

Example 21 includes the computer readable medium of example 13, wherein the two or more processing devices are configurable to operate as different sized single processing devices.

Example 22 includes the computer readable medium of example 21, wherein a combination of the two or more processing devices is configurable via a policy.

Example 23 includes the computer readable medium of example 22, wherein the policy is enforced via a platform trusted execution environment.

Example 24 includes the computer readable medium of example 13, wherein the instructions cause the one or more processors to combine the first output of the first processing device and the second output of the second processing device by at least one of concatenating the first output and the second output, adding the first output and the second output, or multiplying the first output and the second output.

Example 25 includes an apparatus to conditionally activate a big core in a computing system, the apparatus comprising Interface circuitry to obtain a request to operate two or more processing devices as a single processing device, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate hardware management circuitry to in response to the request, determine whether the two or more processing devices are available and capable of executing instructions according to the request, when the two or more processing devices are available and capable of executing the instructions split the instructions into first sub-instructions and second sub-instructions, provide (a) the first sub-instructions to a first processing device of the two or more processing devices and (b) the second sub-instructions to a second processing device of the two or more processing devices, and generate an output for the instructions by combining a first output of the first processing device and a second output of the second processing device.

Example 26 includes the apparatus of example 25, wherein the request is a first request and the instructions are first instructions, the hardware management circuitry to in response to a second request to operate the two or more processing devices as the single processing device, determine whether the two or more processing devices are available and capable of executing second instructions according to the second request, and when the two or more processing devices are capable of executing the second instructions but not available, determine whether the two or more processing devices will be capable of executing the second instructions at a subsequent point in time.

Example 27 includes the apparatus of example 26, wherein the hardware management circuitry is to, in response to determining that the two or more processing devices will be capable of executing the second instructions in the future, transmit a response indicating when the two or more processing devices will be available.

Example 28 includes the apparatus of example 25, wherein the request is a first request and the instructions are first instructions, the hardware management circuitry to in response to a second request to operate the two or more processing devices as the single processing device, determine whether the two or more processing devices are available and capable of executing second instructions according to a parameter associated with the second request, and when the two or more processing devices are capable of executing the second instructions but not available according to the parameter, generate an emulation configuration corresponding to execution of the second instructions based on the first processing device and the second processing device.

Example 29 includes the apparatus of example 28, wherein the hardware management circuitry is to transmit an indication that the second instructions can be executed according to the emulation configuration, and in response to an acceptance of the emulation configuration split up the second instructions into third sub-instructions and fourth sub-instructions, provide (a) the third sub-instructions to the first processing device of the two or more processing devices and (b) the fourth sub-instructions to the second processing device of the processing devices, and combine a third output of the first processing device and a fourth output of the second processing device.

Example 30 includes the apparatus of example 28, wherein the hardware management circuitry is to determine the two or more processing devices are capable of executing the second instructions but not available according to the parameter at a first time and determine the two or more processing devices are capable of executing the second instructions and available according to the parameter at a second time.

Example 31 includes the apparatus of example 25, wherein the hardware management circuitry is to transmit an indication that the instructions cannot be executed when the two or more processing devices are not capable of executing the instructions.

Example 32 includes the apparatus of example 25, wherein the processor circuitry is to instantiate authentication circuitry to authenticate the request prior to determining whether the two or more processing devices are available and capable of executing the instructions according to the request.

Example 33 includes the apparatus of example 25, wherein the two or more processing devices are configurable to operate as different sized single processing devices.

Example 34 includes the apparatus of example 33, wherein a combination of the two or more processing devices is configurable via a policy.

Example 35 includes the apparatus of example 34, wherein the policy is enforced via a platform trusted execution environment.

Example 36 includes the apparatus of example 25, wherein the hardware management circuitry is to combine the first output of the first processing device and the second output of the second processing device by at least one of concatenating the first output and the second output, adding the first output and the second output, or multiplying the first output and the second output.

Example 37 includes a method to conditionally activate a big core in a computing system, the method comprising in response to a request to operate two or more processing devices as a single processing device, determining, by executing an instruction with one or more processors, whether the two or more processing devices are available and capable of executing instructions according to the request, when the two or more processing devices are available and capable of executing the instructions splitting, by executing an instruction with the one or more processors, the instructions into first sub-instructions and second sub-instructions, providing, by executing an instruction with the one or more processors, (a) the first sub-instructions to a first processing device of the two or more processing devices and (b) the second sub-instructions to a second processing device of the two or more processing devices, and generating, by executing an instruction with the one or more processors, an output for the instructions by combining a first output of the first processing device and a second output of the second processing device.

Example 38 includes the method of example 37, wherein the request is a first request and the instructions are first instructions, further including in response to a second request to operate the two or more processing devices as the single processing device, determining whether the two or more processing devices are available and capable of executing second instructions according to the second request, and when the two or more processing devices are capable of executing the second instructions but not available, determining whether the two or more processing devices will be capable of executing the second instructions at a subsequent point in time.

Example 39 includes the method of example 38, further including, in response to determining that the two or more processing devices will be capable of executing the second instructions in the future, transmitting a response indicating when the two or more processing devices will be available.

Example 40 includes the method of example 37, wherein the request is a first request and the instructions are first instructions, further including in response to a second request to operate the two or more processing devices as the single processing device, determining whether the two or more processing devices are available and capable of executing second instructions according to a parameter associated with the second request, and when the two or more processing devices are capable of executing the second instructions but not available according to the parameter, generating an emulation configuration corresponding to execution of the second instructions based on the first processing device and the second processing device.

Example 41 includes the method of example 40, further including transmitting an indication that the second instructions can be executed according to the emulation configuration, and in response to an acceptance of the emulation configuration splitting up the second instructions into third sub-instructions and fourth sub-instructions, providing (a) the third sub-instructions to the first processing device of the two or more processing devices and (b) the fourth sub-instructions to the second processing device of the processing devices, and combining a third output of the first processing device and a fourth output of the second processing device.

Example 42 includes the method of example 40, further including determining the two or more processing devices are capable of executing the second instructions but not available according to the parameter at a first time and determining the two or more processing devices are capable of executing the second instructions and available according to the parameter at a time different than the first time.

Example 43 includes the method of example 37, further including transmitting an indication that the instructions cannot be executed when the two or more processing devices are not capable of executing the instructions.

Example 44 includes the method of example 37, further including authenticating the request prior to determining whether the two or more processing devices are available and capable of executing the instructions according to the request.

Example 45 includes the method of example 37, wherein the two or more processing devices are configurable to operate as different sized single processing devices.

Example 46 includes the method of example 45, wherein a combination of the two or more processing devices is configurable via a policy.

Example 47 includes the method of example 46, wherein the policy is enforced via a platform trusted execution environment.

Example 48 includes the method of example 37, wherein the combining of the first output of the first processing device and the second output of the second processing device includes at least one of concatenating the first output and the second output, adding the first output and the second output, or multiplying the first output and the second output.

From the foregoing, it will be appreciated that example systems, methods, apparatus, and articles of manufacture have been disclosed that increases boot performance. The disclosed systems, methods, apparatus, and articles of manufacture provide a software and/or firmware based application programming interface (API) to process instructions from an application running on an operating system, virtual machine manager (VMM), etc., and instruct microcode to configure the processing units to be able to execute the instructions, regardless of how the instructions are structured. According, examples disclosed herein can combine smaller resources to execute code designed for larger resources without requiring the instructions to be structured for the smaller resources. In this manner, the application can generate one instruction and examples disclosed herein can determine if and/or how to execute the instruction given the constraints of the computing system.

The disclosed systems, methods, apparatus, and articles of manufacture are accordingly directed to one or more improvement(s) in the operation of a machine such as a computer or other electronic.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to conditionally activate a big core in a computing system, the apparatus comprising:
   first instructions in the apparatus; and
   processor circuitry to execute the first instructions to:
      in response to a request to operate two or more processing devices as a single processing device, determine whether the two or more processing devices are available and capable of executing second instructions according to the request;
      when the two or more processing devices are available and capable of executing the second instructions:
         split the second instructions into first sub-instructions and second sub-instructions;
         provide (a) the first sub-instructions to a first processing device of the two or more processing devices and (b) the second sub-instructions to a second processing device of the two or more processing devices; and generate an output for the second instructions by combining a first output of the first processing device and a second output of the second processing device.

2. The apparatus of claim 1, wherein the request is a first request, the processor circuitry to:
in response to a second request to operate the two or more processing devices as the single processing device, determine whether the two or more processing devices are available and capable of executing third instructions according to the second request; and
when the two or more processing devices are capable of executing the third instructions but not available, determine whether the two or more processing devices will be capable of executing the third instructions at a subsequent point in time.

3. The apparatus of claim 2, wherein the processor circuitry is to, in response to determining that the two or more processing devices will be capable of executing the third instructions in the future, transmit a response indicating when the two or more processing devices will be available.

4. The apparatus of claim 1, wherein the request is a first request, the processor circuitry to:
in response to a second request to operate the two or more processing devices as the single processing device, determine whether the two or more processing devices are available and capable of executing second instructions according to a parameter associated with the second request; and
when the two or more processing devices are capable of executing the third instructions but not available according to the parameter, generate an emulation configuration corresponding to execution of the third instructions based on the first processing device and the second processing device.

5. The apparatus of claim 4, wherein the processor circuitry is to:
transmit an indication that the third instructions can be executed according to the emulation configuration; and
in response to an acceptance of the emulation configuration:
split up the third instructions into third sub-instructions and fourth sub-instructions;
provide (a) the third sub-instructions to the first processing device of the two or more processing devices and (b) the fourth sub-instructions to the second processing device of the processing devices; and
combine a third output of the first processing device and a fourth output of the second processing device.

6. The apparatus of claim 4, wherein the processor circuitry is to determine the two or more processing devices are capable of executing the third instructions but not available according to the parameter at a first time and determine the two or more processing devices are capable of executing the third instructions and available according to the parameter at a second time.

7. The apparatus of claim 1, wherein the processor circuitry is to transmit an indication that the first instructions cannot be executed when the two or more processing devices are not capable of executing the first instructions.

8. The apparatus of claim 1, wherein the processor circuitry is to authenticate the request prior to determining whether the two or more processing devices are available and capable of executing the first instructions according to the request.

9. The apparatus of claim 1, wherein the two or more processing devices are configurable to operate as different sized single processing devices.

10. The apparatus of claim 9, wherein a combination of the two or more processing devices is configurable via a policy.

11. The apparatus of claim 10, wherein the policy is enforced via a platform trusted execution environment.

12. The apparatus of claim 1, wherein the processing circuitry is to combine the first output of the first processing device and the second output of the second processing device by at least one of concatenating the first output and the second output, adding the first output and the second output, or multiplying the first output and the second output.

13. A non-transitory computer readable medium comprising instructions which, when executed, cause one or more processors to at least:
in response to a request to operate two or more processing devices as a single processing device, determine whether the two or more processing devices are available and capable of executing instructions according to the request;
when the two or more processing devices are available and capable of executing the instructions:
split the instructions into first sub-instructions and second sub-instructions;
provide (a) the first sub-instructions to a first processing device of the two or more processing devices and (b) the second sub-instructions to a second processing device of the two or more processing devices; and
generate an output for the instructions by combining a first output of the first processing device and a second output of the second processing device.

14. The computer readable medium of claim 13, wherein the request is a first request and the instructions are first instructions, the instructions to cause the one or more processors to:
in response to a second request to operate the two or more processing devices as the single processing device, determine whether the two or more processing devices are available and capable of executing second instructions according to the second request; and
when the two or more processing devices are capable of executing the second instructions but not available, determine whether the two or more processing devices will be capable of executing the second instructions at a subsequent point in time.

15. The computer readable medium of claim 14, wherein the instructions cause the one or more processors to, in response to determining that the two or more processing devices will be capable of executing the second instructions in the future, transmit a response indicating when the two or more processing devices will be available.

16. The computer readable medium of claim 13, wherein the request is a first request and the instructions are first instructions, the instructions to cause the one or more processors to:
in response to a second request to operate the two or more processing devices as the single processing device, determine whether the two or more processing devices are available and capable of executing second instructions according to a parameter associated with the second request; and
when the two or more processing devices are capable of executing the second instructions but not available according to the parameter, generate an emulation configuration corresponding to execution of the second instructions based on the first processing device and the second processing device.

17. The computer readable medium of claim 16, wherein the instructions cause the one or more processors to:
   transmit an indication that the second instructions can be executed according to the emulation configuration; and
   in response to an acceptance of the emulation configuration:
      split up the second instructions into third sub-instructions and fourth sub-instructions;
      provide (a) the third sub-instructions to the first processing device of the two or more processing devices and (b) the fourth sub-instructions to the second processing device of the processing devices; and
      combine a third output of the first processing device and a fourth output of the second processing device.

18. The computer readable medium of claim 16, wherein the instructions cause the one or more processors to determine the two or more processing devices are capable of executing the second instructions but not available according to the parameter at a first time and determine the two or more processing devices are capable of executing the second instructions and available according to the parameter at a second time different than the first time.

19. The computer readable medium of claim 13, wherein the instructions cause the one or more processors to transmit an indication that the instructions cannot be executed when the two or more processing devices are not capable of executing the instructions.

20. The computer readable medium of claim 13, wherein the instructions cause the one or more processors to authenticate the request prior to determining whether the two or more processing devices are available and capable of executing the instructions according to the request.

21. The computer readable medium of claim 13, wherein the two or more processing devices are configurable to operate as different sized single processing devices.

22. The computer readable medium of claim 21, wherein a combination of the two or more processing devices is configurable via a policy.

23. The computer readable medium of claim 13, wherein the instructions cause the one or more processors to combine the first output of the first processing device and the second output of the second processing device by at least one of concatenating the first output and the second output, adding the first output and the second output, or multiplying the first output and the second output.

24. An apparatus to conditionally activate a big core in a computing system, the apparatus comprising:
   Interface circuitry to obtain a request to operate two or more processing devices as a single processing device; and
   processor circuitry including one or more of:
      at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
      a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
      Application Specific Integrate Circuitry (ASIC) including logic gate circuitry to perform one or more third operations;
   the processor circuitry to perform at least one of the first operations, the second operations, or the third operations to instantiate:
   hardware management circuitry to:
      in response to the request, determine whether the two or more processing devices are available and capable of executing instructions according to the request;
      when the two or more processing devices are available and capable of executing the instructions:
         split the instructions into first sub-instructions and second sub-instructions;
         provide (a) the first sub-instructions to a first processing device of the two or more processing devices and (b) the second sub-instructions to a second processing device of the two or more processing devices; and
         generate an output for the instructions by combining a first output of the first processing device and a second output of the second processing device.

25. The apparatus of claim 24, wherein the request is a first request and the instructions are first instructions, the hardware management circuitry to:
   in response to a second request to operate the two or more processing devices as the single processing device, determine whether the two or more processing devices are available and capable of executing second instructions according to the second request; and
   when the two or more processing devices are capable of executing the second instructions but not available, determine whether the two or more processing devices will be capable of executing the second instructions at a subsequent point in time.

* * * * *